United States Patent
Gaidemak et al.

(10) Patent No.: US 11,803,880 B2
(45) Date of Patent: Oct. 31, 2023

(54) SYSTEM AND METHOD FOR THE DELIVERY OF CONTENT TO A NETWORKED DEVICE

(71) Applicant: Groove Digital, Inc., Morristown, NJ (US)

(72) Inventors: Samuel Robert Gaidemak, Chatham, NJ (US); Paul Conrad Chachko, Little Silver, NJ (US)

(73) Assignee: Groove Digital, Inc., Morristown, NJ (US)

( * ) Notice: Subject to any disclaimer, the term of this patent is extended or adjusted under 35 U.S.C. 154(b) by 27 days.

(21) Appl. No.: 16/997,640

(22) Filed: Aug. 19, 2020

(65) Prior Publication Data

US 2021/0004877 A1    Jan. 7, 2021

Related U.S. Application Data

(63) Continuation of application No. 15/821,497, filed on Nov. 22, 2017, now abandoned, which is a
(Continued)

(51) Int. Cl.
*G06Q 30/00* (2023.01)
*G06Q 30/0241* (2023.01)
(Continued)

(52) U.S. Cl.
CPC ....... *G06Q 30/0277* (2013.01); *G06F 3/0481* (2013.01); *G06F 15/16* (2013.01);
(Continued)

(58) Field of Classification Search
None
See application file for complete search history.

(56) References Cited

U.S. PATENT DOCUMENTS 5,848,396 A * 12/1998 Gerace ............... H04L 67/22
705/7.29
6,615,253 B1 * 9/2003 Bowman-Amuah ..........
G06F 16/9574
709/219
(Continued)

FOREIGN PATENT DOCUMENTS

EP        1081607 A2 *  3/2001   ....... G06F 17/30884
JP   2000207873 A  *  7/2000   ............. G06F 13/00
(Continued)

OTHER PUBLICATIONS

Just Van Den Broecke. "Pushlets: Send events from servlets to DHTML client browsers." (Mar. 1, 2000). Retrieved online Feb. 25, 2022. https://www.infoworld.com/article/2076063/pushlets--send-events-from-servlets-to-dhtml-client-browsers.html (Year: 2000).*
(Continued)

*Primary Examiner* — James A Reagan
(74) *Attorney, Agent, or Firm* — Folio Law Group PLLC

(57) ABSTRACT

In a system for delivering information to and displaying information on a networked device of a user, a microprocessor is coupled to a database and a memory device. The microprocessor runs a software application for delivering an applet application to the networked device and managing the delivery of the applet application. The applet application provides for the display of information on the networked device by an applet. The database stores a first set of information relating to the user, and the memory device includes a second set of information for comparison to the first set of information, and a third set of information for display by the applet. The microprocessor compares the first set of information to the second set of information to determine whether to transmit the third set of information to the networked device for display by the applet.

24 Claims, 12 Drawing Sheets

Related U.S. Application Data continuation of application No. 15/276,620, filed on Sep. 26, 2016, now abandoned, which is a continuation of application No. 11/378,423, filed on Mar. 17, 2006, now Pat. No. 9,454,762.

(60) Provisional application No. 60/663,546, filed on Mar. 18, 2005.

(51) Int. Cl.
| | | |
|---|---|---|
| *G06Q 30/02* | (2023.01) | |
| *G06F 15/16* | (2006.01) | |
| *H04L 67/00* | (2022.01) | |
| *G06F 3/0481* | (2022.01) | |
| *G06Q 10/00* | (2023.01) | |
| *H04L 67/04* | (2022.01) | |
| *G06F 3/04842* | (2022.01) | |

(52) U.S. Cl.
CPC ............. *G06Q 30/02* (2013.01); *H04L 67/34* (2013.01); *G06F 3/04842* (2013.01); *G06Q 10/00* (2013.01); *H04L 67/04* (2013.01)

(56) References Cited

U.S. PATENT DOCUMENTS

| | | | | |
|---|---|---|---|---|
| 6,742,015 | B1* | 5/2004 | Bowman-Amuah | G06F 8/20 718/100 |
| 6,920,606 | B1* | 7/2005 | Jablonski | G06Q 30/02 345/619 |
| 7,003,792 | B1* | 2/2006 | Yuen | H04N 21/4826 725/47 |
| 9,454,762 | B2* | 9/2016 | Gaidemak | H04L 67/34 |
| 2002/0083138 | A1* | 6/2002 | Wilson | G06Q 30/02 709/206 |
| 2002/0092019 | A1* | 7/2002 | Marcus | H04N 21/44204 348/E7.071 |
| 2002/0120518 | A1* | 8/2002 | Carney | G06Q 10/02 705/14.66 |
| 2002/0128908 | A1* | 9/2002 | Levin | G06Q 30/0269 705/14.66 |
| 2003/0032409 | A1* | 2/2003 | Hutcheson | H04L 67/04 455/414.1 |
| 2003/0058277 | A1* | 3/2003 | Bowman-Amuah | G06F 16/289 715/765 |
| 2003/0078972 | A1* | 4/2003 | Tapissier | H04N 21/6181 348/E7.071 |
| 2003/0093792 | A1* | 5/2003 | Labeeb | H04N 7/163 725/38 |
| 2004/0043770 | A1* | 3/2004 | Amit | H04L 12/1859 455/450 |
| 2004/0249746 | A1* | 12/2004 | Horowitz | G06Q 20/10 705/39 |
| 2005/0203800 | A1* | 9/2005 | Sweeney | G06Q 30/02 705/14.16 |
| 2005/0240428 | A1* | 10/2005 | Gabrick | G06Q 50/184 705/310 |
| 2006/0015904 | A1* | 1/2006 | Marcus | H04N 7/16 348/E7.071 |
| 2006/0015945 | A1* | 1/2006 | Fields | H04L 67/2823 726/27 |
| 2006/0053048 | A1* | 3/2006 | Tandetnik | G06Q 30/02 705/14.49 |
| 2006/0085758 | A1* | 4/2006 | Backus | G06F 3/011 715/772 |
| 2008/0092155 | A1* | 4/2008 | Ferrone | H04N 21/44224 348/E5.002 |
| 2010/0153831 | A1* | 6/2010 | Beaton | G06Q 30/02 715/201 |
| 2015/0112790 | A1* | 4/2015 | Wolinsky | G06Q 30/0238 705/14.38 |

FOREIGN PATENT DOCUMENTS

| | | | | |
|---|---|---|---|---|
| JP | 2008171038 A | * | 7/2008 | ....... G06F 17/30867 |
| WO | WO-2005038605 A2 | * | 4/2005 | ....... G06F 17/30017 |

OTHER PUBLICATIONS html.com. "Popup Windows Made Easy: Here's The JavaScript Code To Copy And Paste." (Jan. 31, 2001). Retrieved online Feb. 25, 2022. https://html.com/javascript/popup-windows/ (Year: 2001).*

* cited by examiner

SYSTEM AND METHOD FOR THE DELIVERY OF CONTENT TO A NETWORKED DEVICE

CROSS REFERENCE TO RELATED APPLICATIONS

The present application is a Continuation of U.S. Nonprovisional application Ser. No. 15/821,497 filed 22 Nov. 2017; which is a Continuation of U.S. Nonprovisional application Ser. No. 15/276,620 filed 26 Sep. 2016; which is a Continuation of U.S. Nonprovisional application Ser. No. 11/378,423 filed 17 Mar. 2006, now U.S. Pat. No. 9,454,762 issued 27 Sep. 2016; which claims the benefit of U.S. Provisional Application Ser. No. 60/663,546 filed 18 Mar. 2005; each of which is incorporated herein by reference in its entirety.

FIELD OF THE INVENTION

The present invention teaches a system and method for delivering and serving local content and advertisements to an end user on a network, including wired and wireless networks.

BACKGROUND OF THE INVENTION

In the early stages of online ad serving technology systems and networks incorporated technology that provided static ad units that generally changed content by looping different creative ad copy. The ad copy may have initially been primarily text, however, with the advent of HTML and then streaming rich media, ad copy changed to include significant amounts of graphics and embedded pictures and even streaming media.

Early on advertisements were displayed using banners and/or buttons. These banners or buttons would be placed on a Web page where a person could view the ad unit along with the content of the Web site. The idea was that if there was interest in the advertisement, the consumer would click on it and they would be redirected to the advertiser's Web site where they could conceivably take action relating to a purchase or subscription or some other transaction. The Web site that ran the banner ad would generate revenues through payments based on a variety of factors, including the number (usually per thousand) of customers that visited the advertiser's Web site (CPM), per click on the advertiser's Web site (CPC), per conversion of a visit to a sale (CPA), or per lead generated (CPL), etc.

As ad serving technology advanced other types and forms of ad units were developed, most notably pop-ups or pop-unders. A pop-up can be defined as: any advertising experience that utilizes a web browser initiated additional window to deliver an ad impression either directly above or below the existing browser experience.

Some examples of those types of ad units include the following:
1. Rectangles and Pop-Ups in various sizes, including: 300×250—Medium Rectangle; 250×250—Square; 240×400—Vertical Rectangle; 336×400—Large Rectangle; 180×150—Rectangle.
2. Banners and Buttons in various sizes, including: 468×60 IMU—(Full Banner); 234×60 IMU—(Half Banner); 88×31 EMU—(Micro Bar); 120×90 IMU—(Button 1); 120×60 IMU—(Button 2); 120×240 IMU—(Vertical Banner); 125×125 IMU—(Square Button); 728×90 IMU—(Leaderboard).
3. Skyscrapers in various sizes, including: 160×600 IMU—(Wide Skyscraper); 120×600 IMU—(Skyscraper); 300×600 IMU—(Half Page Ad).

In mid-1998 to early 1999, email became a preferred means of delivering targeted advertising to a consumer. As this type of marketing became acceptable practice, certain guidelines were adopted by advertisers and recommended and supported by the DMA (Direct Marketing Association). The underlying concept was that as long as a user gave permission to be the recipient of information, either from the Web site that the user was viewing or from a partner Web site, then an advertiser could approach that consumer by sending them an email. This requirement was manifested by permission being granted through opt-in or opt-out boxes that were generally located on registration pages. In order to avoid subversive practices, Privacy Policies were instituted by advertisers and companies that explained to the consumer how their email address and information would be used. The email messages also incorporated certain information identifying the party sending the email, and included an unsubscribe link at the bottom of the email to allow a person to remove themselves from the database and no longer receive such emails. Many companies and individuals failed to abide by the DMA requirements and much abuse abounded within email marketing community. The term SPAM was coined to describe unsolicited email.

In the early days, an email marketing campaign would have been a text message with any number of hyper links embedded within the message. As creative elements evolved and with the advent of HTML, there was a marked shift away from text and to HTML. Advertisers often times sent both a text version and a HTML version so that they could increase the delivery ratio.

Spiders and robots were developed to steal email addresses and information without the consumer's knowledge. These were the earliest types of Spyware and adware.

In 2003, a new means of communication with a consumer (user) began to proliferate, through AOL and its AIM (instant messaging) program. Although AIM was not advertising based, it did communicate to the user when one of their buddies signed onto AIM. Prior to this type of notification, the buddy's name merely appeared in a buddy list. The buddy would be told if other buddies were online, and they would not be listed in the buddy list if they were offline.

AOL incorporated an application as part of the AIM program whereby a notice or alert would peek up from the system tray of the computer desktop and notify the user that a buddy in the user's buddy list was now online, idle or had just signed off. Toward the end of 2003, other instances of this type of application were presented to the user, including as a means by which software (e.g., anti-virus) companies could convey to their users that updates were available. In late 2004, this type of application found it's way into products such as Ding (Southwest Airlines) and SnowMate.

These applications associate a web page with an alert notification. These notifications, however, are tied to the site and are not used to send ancillary information to a user other than something that is available directly from the purveyor of the notification.

SUMMARY OF THE INVENTION

The present invention teaches a system and method for delivering and serving content, information and/or advertisements to an end user on a network, including wired and wireless networks. An embodiment of the present invention uses an applet to provide content delivery to a user connected to a network. The network can be any type of network, including, for example, a LAN, WAN, Internet, wireless, cellular, or WiFi. In this embodiment, by downloading executable software onto a hard drive or memory of a device, such as, for example, a computer, PDA, cell phone, etc., content, information and/or advertising may be delivered to a user. The offers may be localized or distributed to one or more specified or non-specified regions.

The present invention also provides for the delivery and management of content, including, for example, local or targeted content, deployed from a system tray or program bin of the user device, for example, on a virtual desktop it is generally located at the bottom right hand corner of the "task bar", through the use of a content delivery applet. The content may be any type of content, including, for example, advertising, multimedia, ring tones, skins, wallpaper, critical information, weather, traffic reports, education, dating, auctions, surveys, inter-company notifications and messages, etc. The location in the applet where the content is located may be a mini-web browser, such as, for example, Microsoft Internet Explorer or Netscape Navigator. The applet must be installed by the user into a memory location of their device, such as, for example, onto their hard drive, ROM, or RAM.

Each applet may be designed to be uniform in nature and roughly 1.5×1.5 in area, or alternatively, may be uniquely shaped or sized. The applet may display the logo of a product, brand, good or service. When activated, it remains visible to a user for a fixed period of time, such as, for example, about six seconds. Alternatively, the applet may remain visible for variable periods of time. In addition to static images, the applet may deliver items such as, for example, streaming video, rich media or sound.

The present invention also provides for the assembling of a user base consisting of geographic and demographic information through data collected from a user prior to downloading of an applet. Information may also be obtained from a user at the time of sign-up, for example, through a sign-up form presented to the user prior to signing on. The user information may also have already been obtained or already reside in a database. When the geography or demographic or other information about a user or target of the content and the criteria relating to the distribution of an offer correspond, the offer may be passively or invasively delivered directly into the system tray of the user via the applet. The offer may be delivered passively by setting some sort of signal to which the user may respond, thereby causing a delivery of the offer. Alternatively, the offer may be delivered invasively into a visible location on the virtual desktop or audibly. Although the applet does present itself to the user periodically, it is non-invasive in the sense that a user knows that it will be presented, but does not take over the cursor or interrupt the user's interaction with the active application.

Each applet may be served onto the virtual desktop by ascending from the system tray and may be subsequently withdrawn from the virtual desktop by descending back into the system tray, or may be deployed in any other manner, such as, for example, by peeking in and out from the side, top or bottom of the screen or some other screen location. The applet may descend after a predetermined period of time or based on a user action, such as, for example, a mouse click or key stroke. The applet descent may also be prevented through a user action, such as, for example, one or more mouse clicks or key strokes. Activation and/or deactivation of applets will not disrupt the workflow of the user or compromise the virtual environment in which a user is interacting unless or if a user clicks on an applet. This act of clicking or not clicking, as the case may be, will cause a micro-browser to launch onto the virtual desk top. Alternatively, it could cause a new or other web page to open or move to the forefront. The web page that is opened may be directly associated with the content in the applet. In the embodiment where the failure to click causes a launch of a micro-browser, there may be a timer set upon appearance of the applet within which time the applet must be clicked to prevent launch of the micro-browser. Alternatively, the launch of the micro-browser may be tied to a key stroke or series of keystrokes, or a lack thereof. If the user "clicks" on the offer in the micro-browser, the user will be prompted to print the offer or a coupon associated with the offer or accept the offer. Such acceptance may cause an automatic download of purchasing information from the user, such as, for example, address and credit or debit card information. Additionally, the user may input information through the applet, including by clicking on certain locations, such as, for example, an answer to a survey. The response or click could direct the entire applet or a portion or carve out of the applet to a web site. For example, links may be embedded into the applet and it may act like any web site that grabs URLs. Control of the applet may be orchestrated through the use of a variety of control mechanisms or actions, such as, for example, touch screen controls, voice activation controls, or laser or light based controls.

The present invention also provides for the ability to download a single copy of the applet application which will allow multiple sources to download information to the device upon which the applet application is loaded. For example, if a user downloads the applet application from a single retailer, there is no need for the user to download additional copies of the application. Moreover, the system will automatically recognize that the application is already loaded on the system and the user may access other offers from providers of the applet application without having to reload the application. The system will also automatically provide a new or different skin, information and/or look and feel for the applet deriving from different providers, depending on the criteria set by the provider and/or by the user for such provider's applet and/or information. Should there arise a conflict between offers, i.e., multiple offers from different providers arriving at the same time, the system will stagger, schedule or arrange for the orderly deployment of the applets for each provider, such as, for example, in sequence, by multiple applets being displayed, or some other method.

The present invention provides for a web based user-interface to allow administrators to control, program, schedule, track and report in real time back to an advertiser. In addition, advertisers can log into a dedicated account page which would allow them to view in real time their activity and how their offers are performing.

DETAILED DESCRIPTION

Figure 1:
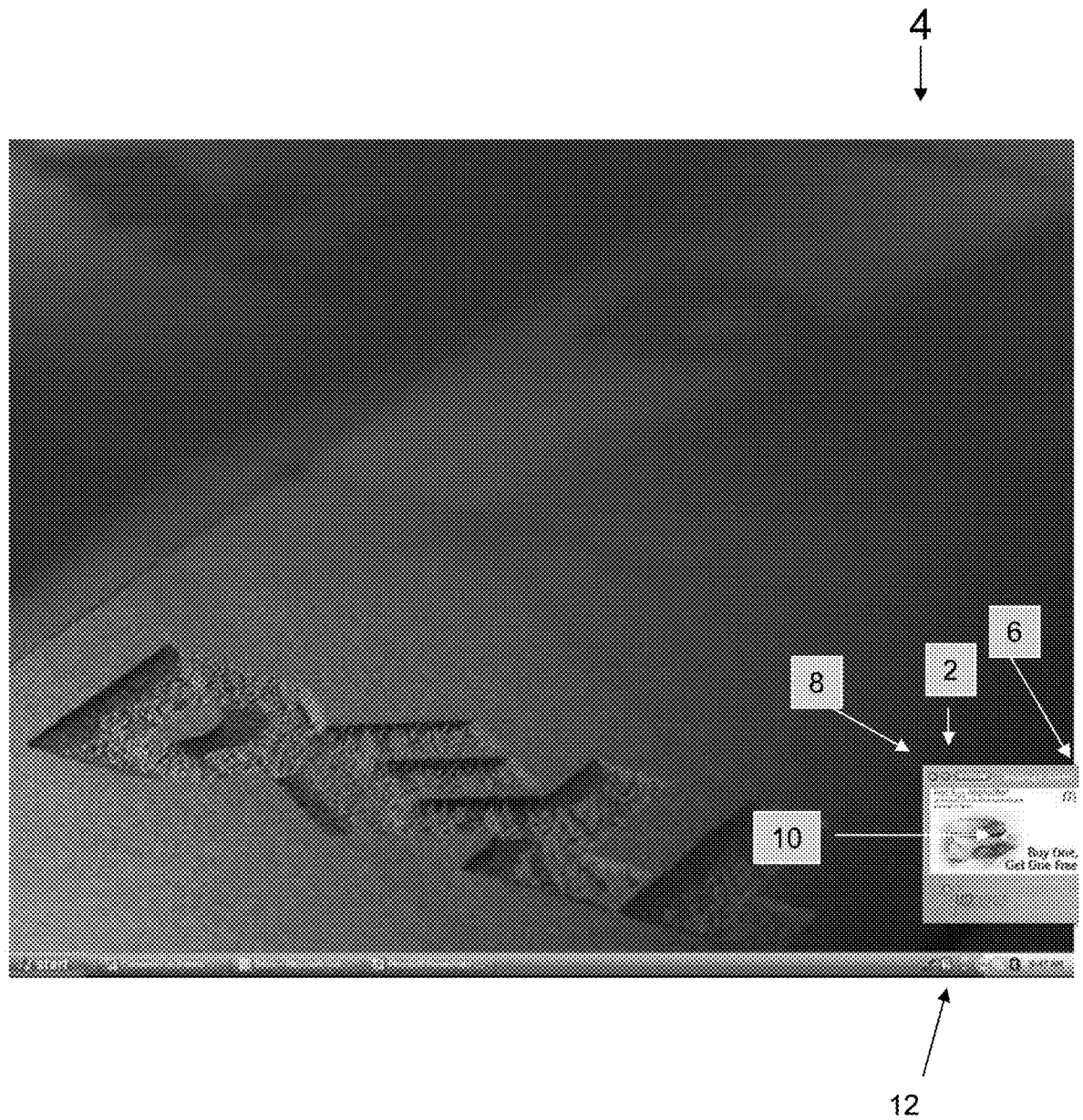
FIG. 1 shows an applet according to an embodiment of the present disclosure.

The following detailed description provides a basic overview of an embodiment according to the present invention. Unlike other advertising applications, the present invention provides an applet (also known as an alert or notification) that is served from the system tray of the virtual desktop. The applet's emergence onto the virtual desktop and concealment into the system tray is triggered by certain conditions and parameters as further described below. When activated, the applet remains in view of the user for a predetermined period of time, such as, for example, about six seconds, although this time period is flexible and may be changed by the administrator and/or the user. As shown in FIG. 1, the applet 2 may be of any size, although in this embodiment, for viewing on a computer virtual desktop 4, it is set to approximately 1.5 inches×1.5 inches. The dimensions of the applet can be expanded or reduced to any desired size. For example, an applet having an area of 3 inches×3 inches may be created by the user simply by dragging the cursor over the top right corner 6 or top left corner 8 of the applet 2, clicking and then dragging diagonally. This method of expanding the size of the applet 2 is merely an example of how this may be accomplished, but may be accomplished by any other method, including for example, by clicking on the applet (with predetermined size variations per click) with a right, left or combination of clicks, by one or more key strokes, screen touches or any other method.

Unlike other ad units, the applet according to an embodiment of the present invention is deployed from the system tray of the virtual desktop. The emergence of the applet onto the virtual desktop and concealment into the system tray is triggered by the system. An applet typically displays an HTML logo of a product or brand for advertising messages of goods and services. However, the information displayed on the applet may also integrate text or rich media as well as audio. All applets are served based on geo-target specifications that are defined in the system. The background color and/or the texture of an applet is set to a default setting, however, other skins can be imported or the features modified for a custom look.

The applet will display a certain information, which in this instance is a logo 10 of a product or brand ("Offer") and/or advertising messages for goods and services. Alternatively the applet can provide any information to a user or target audience. The logo 10 displayed on the applet 2 may also or alternatively integrate any of the following: HTML, text, streaming video, other rich media and/or sound. The applet 2 may be targeted to a particular audience, but may alternatively be distributed randomly, embedded in or bundled with a device or software application, or by request or user opt in. Alternatively, to deactivate, there may be a user opt-out procedure. Targeting is determined by matching the geographic and demographic specifics of the user with the segmentation requirements of an advertiser's offer. The default for a simple geo-target is the zip code. However, alternative criteria may be used, such as, for example, general range, specific radius, SCF, or geographic region.

A user obtains an applet 2 or applet application from a client that has determined to implement the system for creating a direct to consumer linkage and relationship. The applet application may be provided to a user through a CD-ROM or any other media, which may be offered to users by a company, such as, for example, a retailer, as part of their promotional or marketing materials. The client offers, through a direct mail or email or other type of campaign, the capability for a user to implement and utilize a non-invasive, passive system whereby the user may be notified as to certain offers directly from the client and/or through third parties associated with the client. For example, where the client is a retailer, such as, for example, Macy's, Sears or Wal-Mart, the retailer may offer promotions, discounts or coupons directly from the retailer and/or from companies whose products are sold by the retailer, such as, for example, Champion, Polo, Levis, Black and Decker, Panasonic, etc. This is beneficial to the user who can obtain access to these offers without being interrupted by pop-up ads that are intrusive and uncontrolled, but instead is merely notified by a non-obtrusive small sized applet 2 that is deployed in a predetermined location on the virtual desktop 4 and that does not interrupt that user's activities on the user's device, such as, for example, a computer, PDA or cell phone. Should the user opt-in, the user is directed to a web site where the user may download the applet application, which is stored on the hard disk or other memory location on the user device. The applet application stays dormant in the system tray 12 of the virtual desktop 4 until such time as an offer is presented to a user through deployment of the applet 2. The applet application may be offered to the user by any other type of party, including web aggregators, marketing companies, educational institutions, news agencies, content providers, service providers, phone companies, etc.

Figure 2:
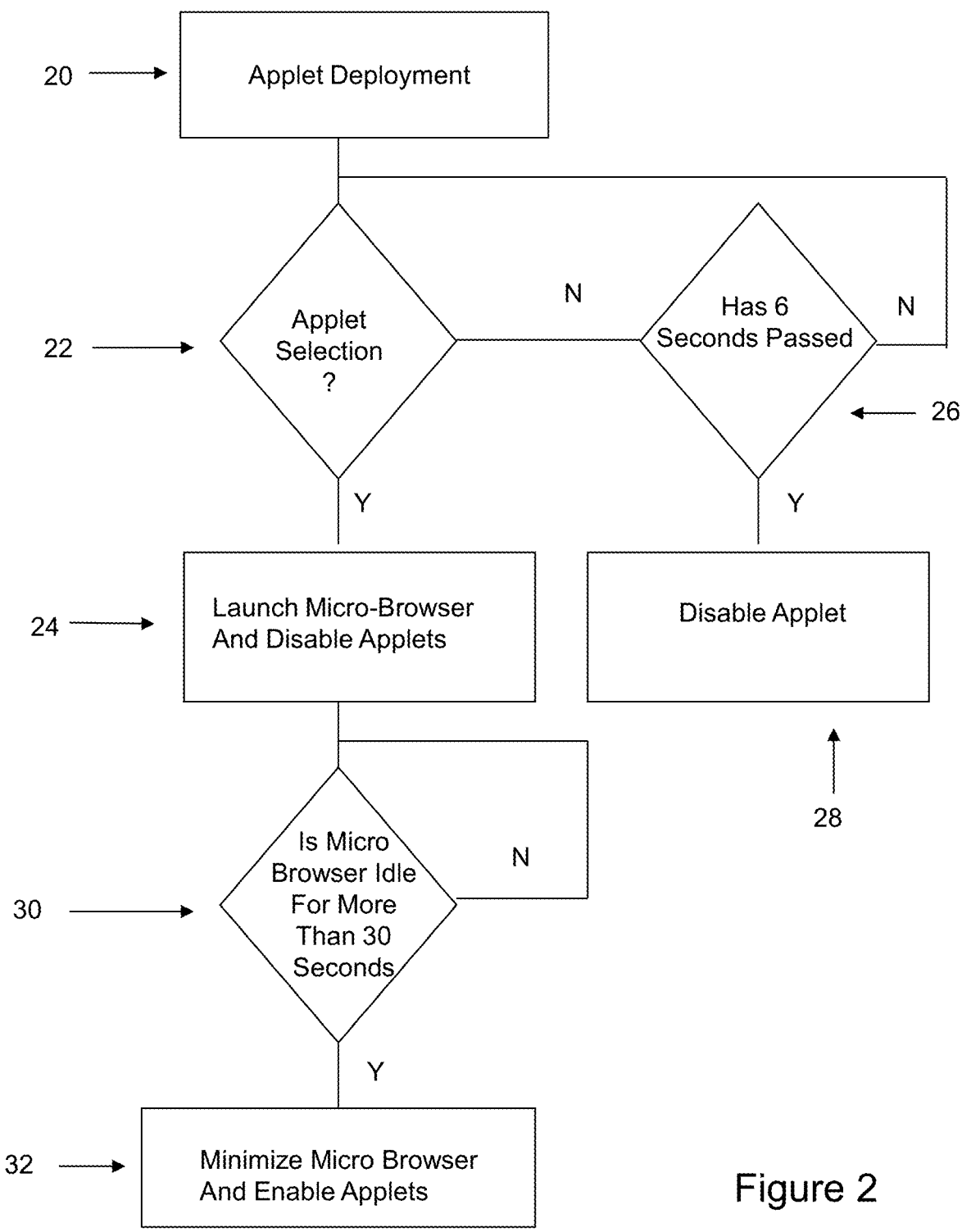
FIG. 2 shows a process by which a user may select an offer presented by an advertiser through an applet according to an embodiment of the present disclosure.

Turning now to FIG. 2, there is shown a process by which a user may select an offer presented by an advertiser through an applet according to an embodiment of the present invention. When applet is deployed, in step 20, the system determines whether the user clicked on or selected the applet, in step 22. If a click or selection is detected, in step 24 a micro-browser launches onto the virtual desk top. If a click or selection is not detected, in step 26 a timer determines whether six seconds has passed, after which time, in step 28, the applet will become disabled and retreat to the system tray of the virtual desktop. When the micro-browser is open, the deployment of applets is halted. In step 30, the system monitors whether the micro-browser is active. If the micro-browser remains idle for more than 30 seconds, in step 32 it will automatically minimize into the task bar and there will be a resumption of deployment of applets onto the virtual desktop. Deployment of offers may be accomplished through the deployment of one or more applets, each located in a different area of the virtual desktop. The deployment and launch of the micro-browser may alternatively be accomplished based on inaction, or some action other than clicking, such as, for example, one or more key strokes, mouse movements, or screen touches. According to this embodiment, applets are displayed from the system tray of the virtual desktop.

Figure 3:
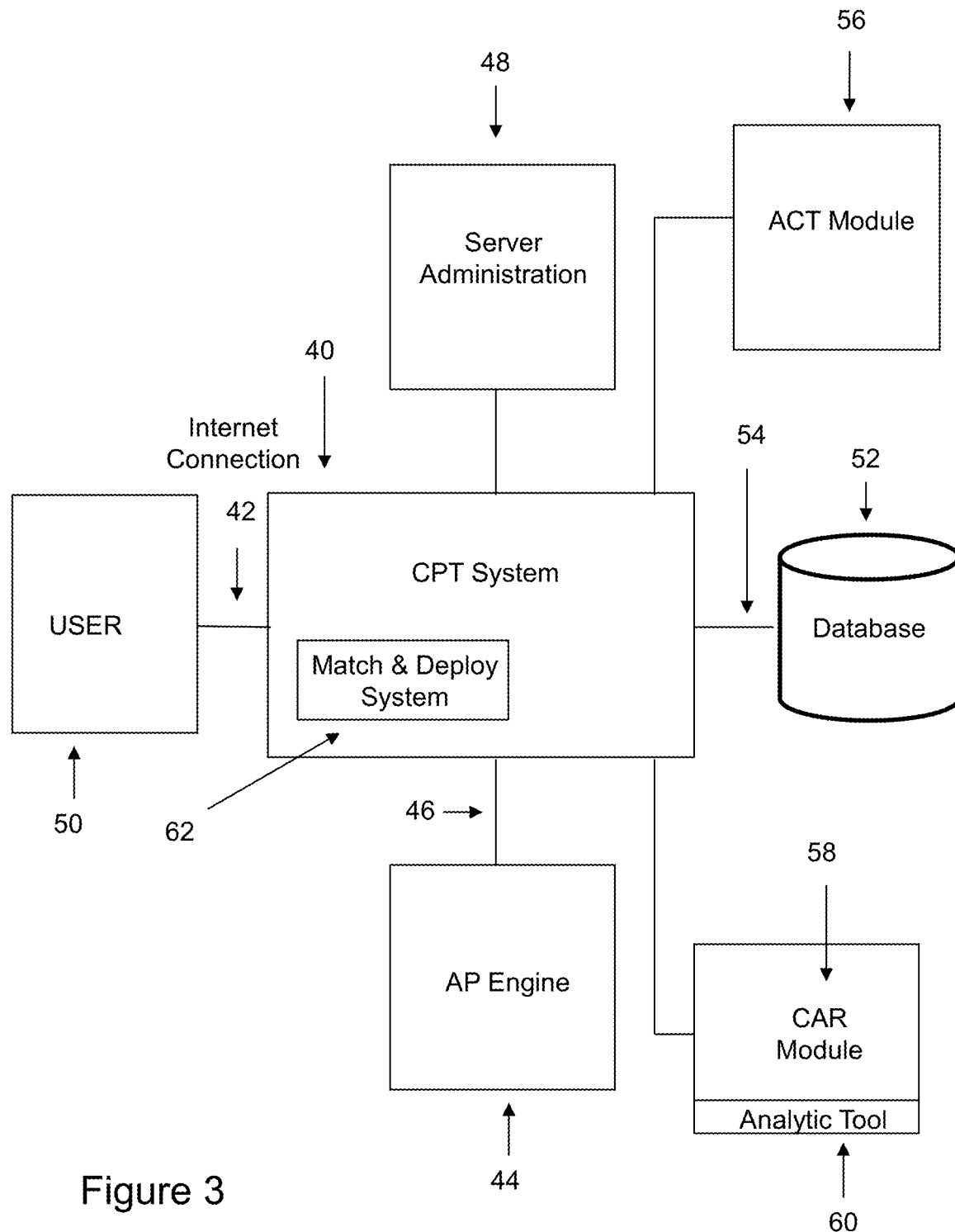
FIG. 3 shows a system for deployment, control, tracking and management of applets and campaigns, according to an embodiment of the present disclosure.

Now looking at FIG. 3, there is shown a system for deployment, control, tracking and management of applets and campaigns, according to an embodiment of the present invention. Deployment of applets is triggered and controlled by a campaign deployment and tracking system 40 ("CPT System"). The system according to the present invention is made up of a number of components. One component, the CPT System 40 is an ASP application resident on a server that accommodates delivery, serving, tracking, and reporting of a campaign. Though the application itself is hosted on a dedicated server, access to the CPT System may be gained via an Internet connection 42 at a specific URL. The CPT System is coupled to the analytic and profiling engine 44 ("AP Engine") of the system via bus 46. The AP Engine 44 provides the capability for a user to observe in real time either active individual and/or aggregate campaigns as well as any campaign, either individual or aggregate, that has concluded. Utilization of the CPT System 40 is assigned by a server administrator 48. A user 50 may access the CPT System via the Internet connection 42. The scope of capabilities of the CPT System 40 that a user 50 can access is based on the degree of authorization granted to the user 50 by the server administrator 48. Authorization is granted to the user 50 via a unique user name and password. The user 50 may be an employee of the company offering the application or a client of the company, such as, for example, an advertiser.

Figure 4:
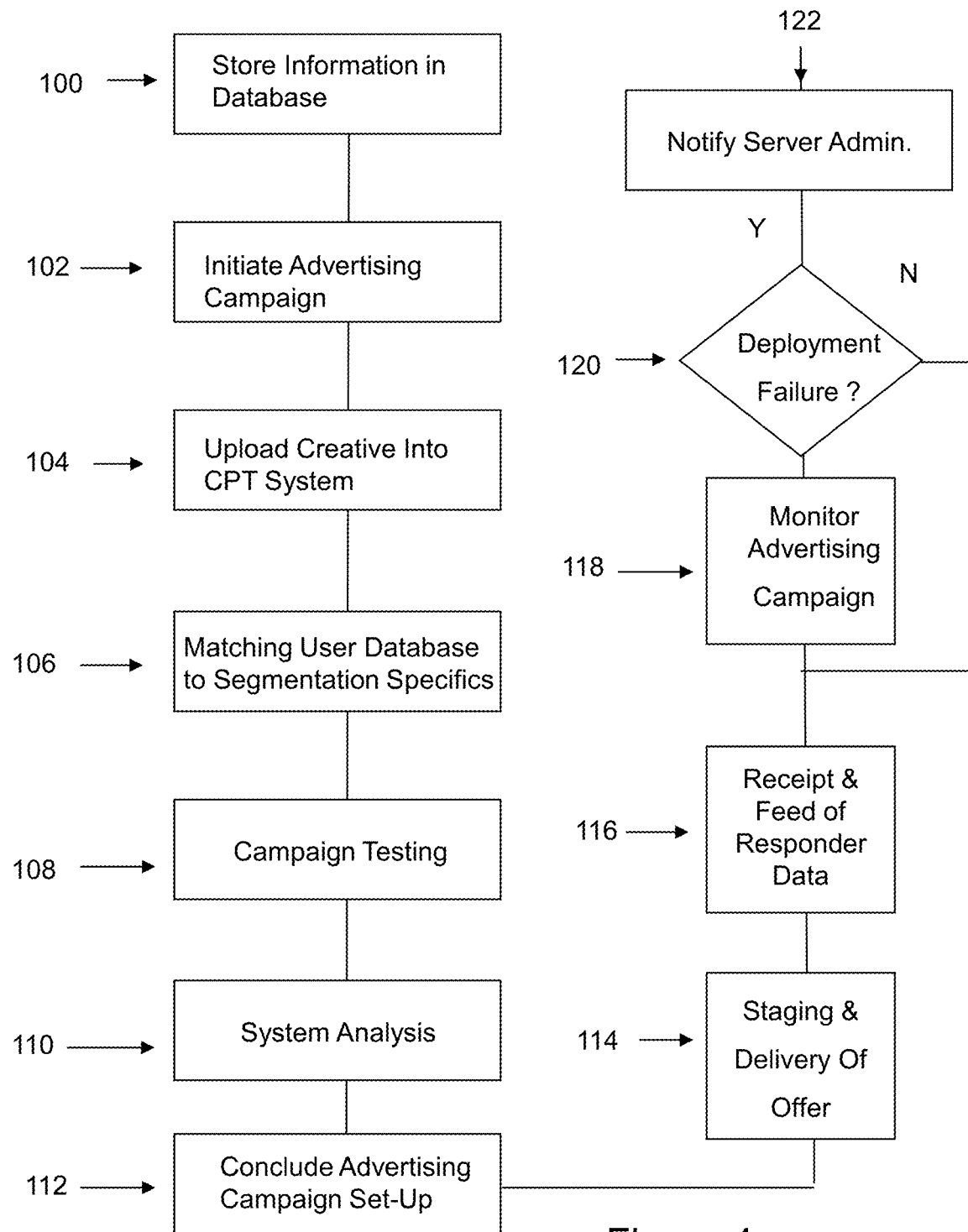
FIG. 4 shows a process for the implementation of an advertising campaign according to an embodiment of the present disclosure.

FIG. 4 shows a process for the implementation of an advertising campaign according to an embodiment of the present invention. In step 100, information relating to the user 50, the advertising campaign and the deployed applets, including end-user information, is stored in a database 52, as shown in FIG. 3. As also shown in FIG. 3, the database 52 is coupled to the CPT System 40 via data bus 54. In step 102 an advertising campaign set-up is initiated. The initial phase of an advertising campaign set-up involves receiving the content offer, including, but not limited to, visual or audio components, as well as other associated creative elements such as hyperlinks, links and/or advertising copy from the advertiser. All campaign geo-target data is provided by the advertiser. Once all the creative has been received and there is confirmation that everything is properly formatted, in step 104, the creative is uploaded into the CPT System 40. The set-up of all insert tracking around any active hyperlinks and all geographical and demographic segmentation occurs at this time, as shown in step 106, by matching the user portion of the database 52 to the segmentation specifics.

Upon completion of initial advertising campaign set-up process, in step 108, the CPT System 40 initiates testing of every aspect of the campaign from applet deployment to offer redemption. An advertising campaign can be tested through staging internal deployment of the applet, micro-browser, and offer redemption. In step 110, the CPT System 40 and server administrator 48 conduct a system analysis to make sure that all tracking is activated and responding to the internal calls-to-action. The internal test occurs using the CPT System's 40 web based interface by the server administrator 48 setting up the campaign.

Once approved, the advertising campaign is then transferred into the traffic sector of the CPT System 40. Concluding the advertising campaign set-up, as shown in step 112, includes defining and scheduling the offer's flight or deployment dates. Once these parameters are defined, in step 114, the CPT System 40 automatically stages and delivers the offer. This behind the scenes application ensures that the applet is served accurately for each scheduled advertising campaign. This includes distribution, for example, by target segmentation, date, frequency, time, rotation, etc.

In step 116, the deployment system automatically feeds the applet responder data to the tracking component of the CPT System 40.

As shown in step 118, the CPT System 40 is responsible for 24/7 activity monitoring of all advertising campaigns. As shown in FIG. 3, the advertising campaign tracking module 56 ("ACT Module") tracks and reports on all applets deployed, opens, clicks, and forwards. In step 120, the CPT System monitors the deployment process. If the CPT System 40 identifies that it is deploying applets that fail to deploy an offer, or that any other phase of the process is not integrated or being reported on, then in step 122, it will automatically send an email message to the server administrator 48 that set-up the advertising campaign notifying it of this problem. The campaign can be offered to a client, i.e., advertiser, with pricing based on various parameters, such as, for example, day parts.

As shown in FIG. 3, the campaign analysis and reporting module 58 ("CAR Module") which is coupled to the CPT System 40 provides an array of analytic and profile tools. This module is customizable and is designed to generate real time reporting for the user via the Analytical Tool 60.

The Analytical Tool 60 is a software application that provides the capabilities for and functionality of compiling all deployment and responder data to be analyzed and profiled. It allows an administrator to generate graphs, reports and charts, which can be viewed, printed and/or saved onto a computer hard drive or other storage medium in PDF, Power Point, export via FTP or some other format.

The Analytical Tool 60 is significant because it can define a specific advertising campaign or the sum of multiple campaigns by client or general category, vertical, or all in terms of the following: applet deployed, applet opened, applet click-through, frequency delivered, time delivered, user opens, user click-through and the count on user's printing of the offer, etc.

The advantages of deploying an applet on a virtual desktop include that it requires limited memory resources, and is usually portable between operating systems.

The type of content that is provided through an applet, may include, for example, advertising, offers (local and brand name), coupons, product awareness campaigns, sponsorships, lotteries, sweepstakes, auctions, online dating, cellular phone applications.

Figure 5:
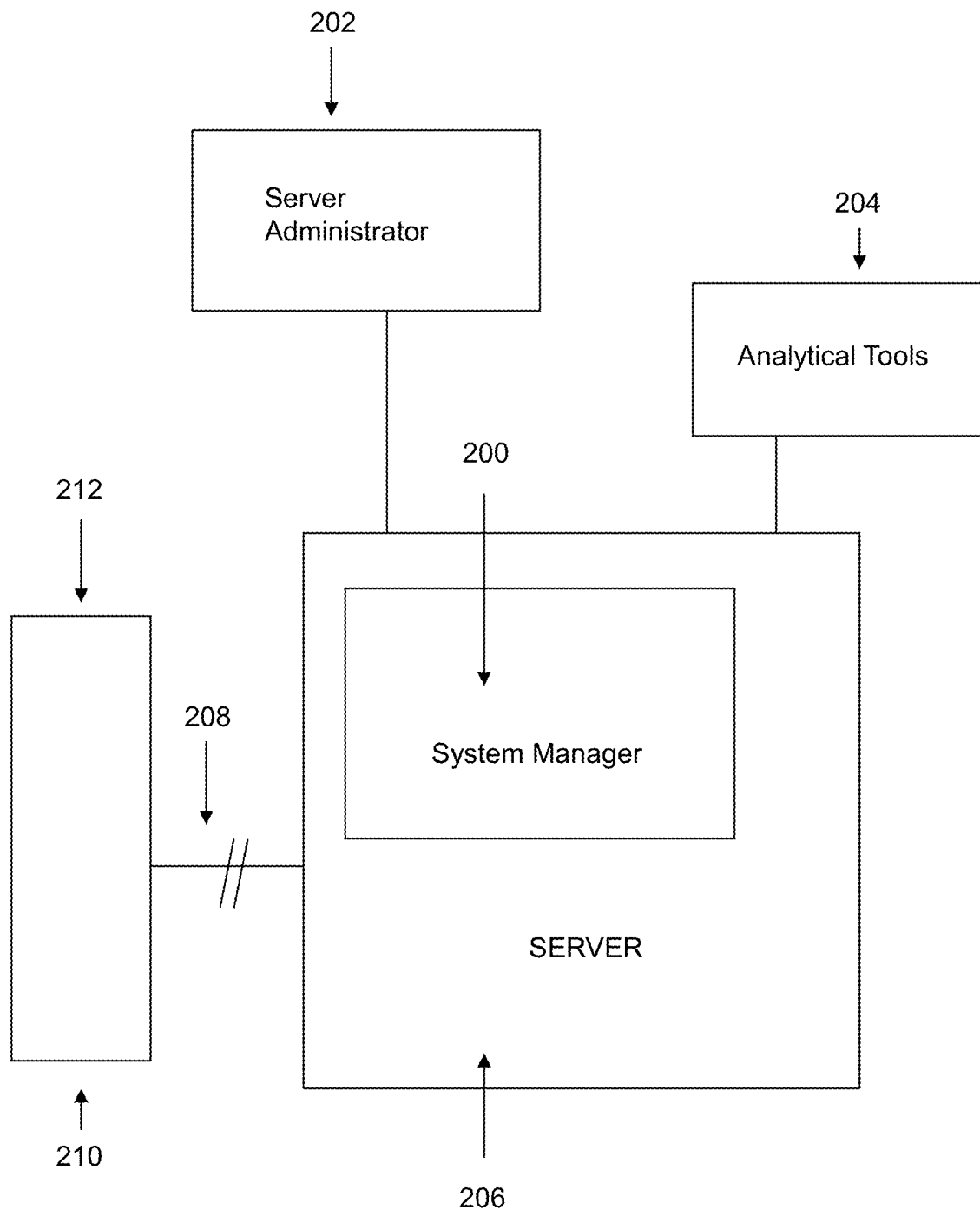
FIG. 5 shows a second embodiment of a system according to the present disclosure.

FIG. 5 shows a second embodiment of a system according to the present invention. This embodiment provides for the implementation of each phase of applet delivery. A system manager 200 is responsible for organizing all actionable events, creating data logs, manipulating data so that a server administrator 202 or one or more analytical tools 204 coupled to the system manager 200 can analyze the advertising campaign(s), profile the results, and generate comprehensive reporting for the client. The system manager 200 can be implemented as hardware, software or a combination of hardware and software. The system manager 200 can track either a single advertising campaign or multiple advertising campaigns or events mutually independent of each other. The system manager 200 may be housed on a server 206 at a local site or alternatively at a centralized or remote location. The system manager 200 may be accessed by a client 210 via an Internet connection 208. In order to access the system manager 200, the client 210 will be granted a user name and password by the server administrator 202.

Depending on the nature of the client 210 there will also be various levels of access allowed to the system. Access to the system, either directly or indirectly, such as, for example, through an ASP may be provided through a wired or wireless connection, such as, for example, wireless internet using a device, such as, for example, a computer, PDA, cell phone or other wireless handheld device.

Because all applets bypass ISP's, SMTP, and POP3 servers, all that is need to receive an applet from the system manager 200 is that the application running the applet must be installed on the hard drive, or some other storage location of the client's device 212, such as, for example, a computer, PDA or cell phone. Once installation is completed and verified, the application communicates with the system manager 200 and the system manager 200 records the geo-target of the user and the IP address of the device 212. The system manager 200 may later extract and link this information with the particular offer during the match and deploy phase, where offers are matched to the user profiles and an advertising campaign is deployed. The campaign may alternatively be an informational, promotional, political, safety, news, health, educational or other type of campaign.

An advantage of the applet is that it is in constant (or periodic) communication with the client's device 212, so that the server administrator can determine in real time how many users are online or in any geo-target at any given moment. This ensures deliverability of information through an applet, and since an applet is not a pop-up, and has been pre-approved by the user, it cannot be blocked if it is activated. A user may be connected to their data or other data to which they are allowed access on the system, based on their ID and password and access rights. The user may be connected to their information or data without the need for any of the user's personal information. This is accomplished by providing the user with an identifier relating to various fields or characteristics and storing the identifier in the database. When such identifier is presented to the server administrator, the user data is accessed and provided to the user or the client without any personal information being provided to the server administrator. The identifying information for the user may be stored at the location of the client or provider of the offer or applet application or some other location.

Three phases of a campaign set-up will next be described. For any campaign to work effectively, the system must be able to target the offer to the right audience. A system having an effective data collection and data input method will provide a more robust infrastructure for operation of the system and effective targeting of offers. The system and method according to the present invention provides for effective data input and data collection. When a user signs onto the system, the system manager collects information about the user and stores it in one or more relevant databases. Although the system administrator may maintain multiple fields of information on a user post installation, the primary field needed for targeted delivery of applets is a zip code. Once the zip code is uploaded into the database, the system will geo-target the offer on an automated basis. The administrator can query the system to determine the total universe of applets installed within a geo-target and how many users are online at the time the applets are deployed.

To personalize the implementation on a user device, the user's first name may be provided to the micro-browser, although this is not necessary as there is a default greeting on all micro-browsers. Communication via email is also not necessary, although obtaining an email address may provide advantages in order to send product updates or to inform the person of new features of the product. Demographic information or performance metrics obtained regarding a user from actionable events may be stored and maintained in memory and used at the data input stage. This information can be used to assist in optimizing a target audience for an offer.

To administer a campaign, the content relating to the offer must be obtained and formatted for optimal display and viewing by the target audience. The client for whom the campaign is being prepared, organized and managed must provide the materials, including the content that is to be included in the campaign. The client must also identify, or work with the administrator to identify the target market for the campaign. Upon receipt of the creative ad copy and graphics the administrator converts that information into the proper format for display. The applets are able to accommodate both static and rich media visual and audio formatted data, such as, for example, HTML, JPEG, XML, Text, Animated Giff, Flash, Streaming video, JavaScript, Shockwave, Apple compatible format (QuickTime), WAV, MPEG, mp3, etc. These creatives are then uploaded into the applet. The administrator will have the ability to validate and test the campaign within the applet. The campaign will also be tested with the client.

When organizing a campaign, certain campaign specifications are designated prior to deployment of the campaign. For example, the logo for the applet should be formatted and validated. Since the technology and programming language of applet will interact with other programs on the device hard drive or memory, certain dynamic indicators may be specified. For example, if the administrator receives text, then all other default creative should be removed and the applet will be formatted to serve text only. If, however, the administrator receives several creative logo types such as streaming video, HTML or text, then the administrator should specify the hierarchy of the order in which the creative is to be delivered. "Sniffer" technology will determine the optimum format of the applet to be deployed.

A calendar function allows for applets to be scheduled and deployed on certain dates and at certain times. A traffic controller allows for timing and intervals deployment of applets. It is also the staging area that integrates with the calendar function so that inventory does not exceed capacity and vice versa. The CPT System also provides dates and time stamps when applets are deployed. Client side geo-targets may be selected based on exact zip code, radius or SCF, and/or region.

All elements of tracking are set-up at a tracking controller. Any actionable event can be tracked and reported on. A campaign manager provides for control of the campaign, and allows for flexibility in sales and distribution. Since there is a hard cost associated for applets that are deployed, the campaign manager ensures that client applets are not deployed in excess of the prearranged number that have been agreed to and paid for by the client.

The applet application may be tested by sending the approver an email. The approver clicks on a link that redirects the approver to the web site. The page that they are directed to presents a notice, the micro-browser and a coupon which can be viewed. If there are any errors in the process, the server administrator may be notified by clicking on a link or sending an email or some other method of notification. If the user approves then the user may click or activate an approval key and the system will log this information.

The offers may be categorized into various levels or types. For example, there may be premium offers or branded offers. The administrator may specify whether the campaign is to be a premium offer, in which case, the offer will be deployed in an applet. In the case of branded offers, the offer is held in a queue until it is converted into a premium offer, at which time it will be deployed as in an applet. Since all branded offers become premium offers, scheduling of branded offers into premium offers is necessitated.

The CPT System includes a fail safe function. This allows the administrator to determine if applet are not being delivered or deployed correctly and allows for troubleshooting and resolution of any such problems.

As users interact with applets this information is uploaded to the database. If a campaign is under performing, optimization criteria can be set so that other inventory or geo-locations may be selected in an effort to pull users that may be more responsive.

All information on each user is housed in a user profile database. Further, any other information that is elicited based on opens or clicks of an applet is then channeled back into the database so that targeted segments may be created for future offers.

Figure 6:
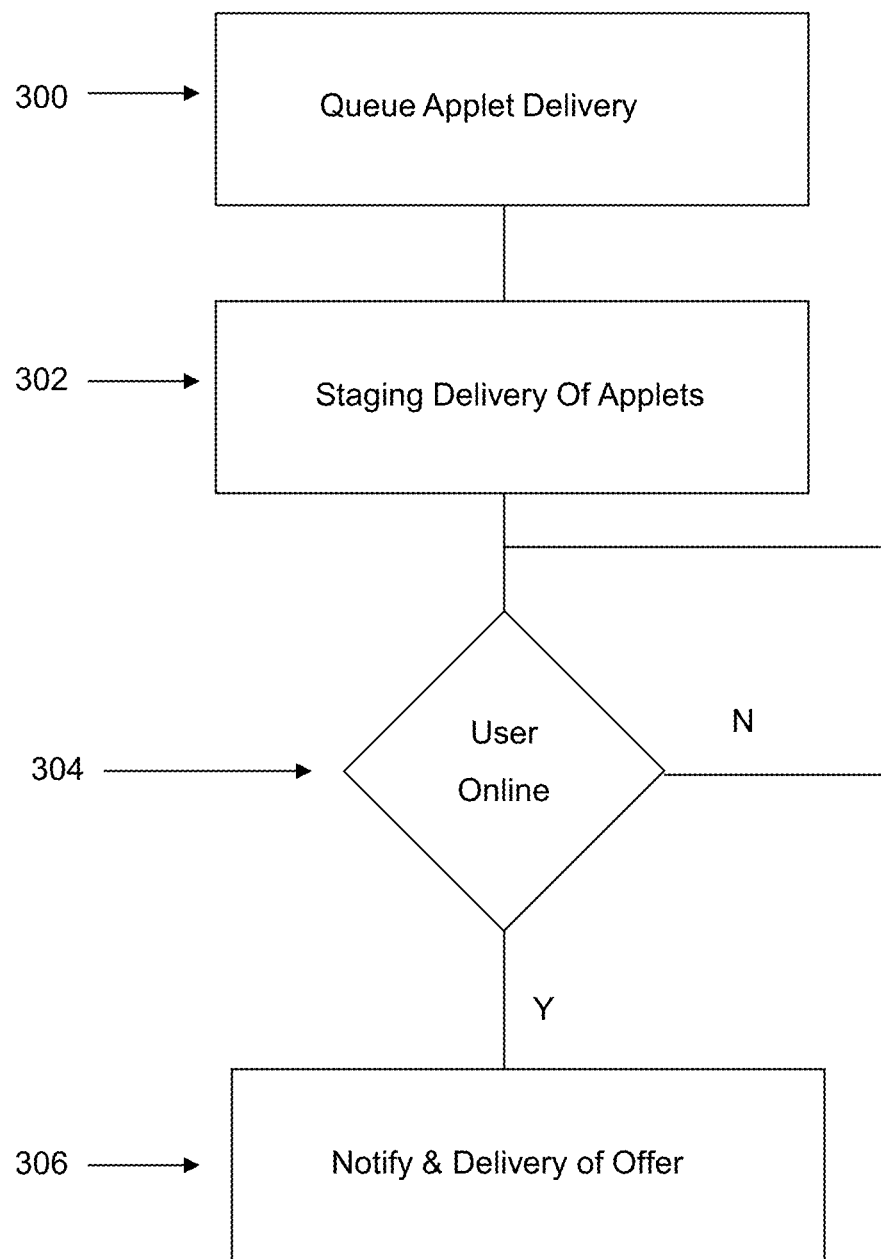
FIG. 6 shows a process for delivery of an offer according to an embodiment of the present disclosure.

Referring again to FIG. 3, the CPT System 20 includes a match and deploy system 62 ("MDS"). The MDS 62 coordinates all offers with corresponding geo-target specifications. Turning now to FIG. 6, there is shown a process for delivery of an offer according to an embodiment of the present invention. In step 300, once the inventory or content for an offer is selected, the CPT System 20 then queues the delivery of all applets into the system tray of the user 50. Staging of the delivery of offers only occurs when the user 50 is online. In step 302, staging of the offers staggers the deployment of applets so that those users that are online are not deployed excessive numbers of applets. In step 304, the CPT System monitors whether the user 50 is online. Once a user 50 comes online and the applet is activated, in step 306, the CPT System 20 is notified and commences delivering the offer into the system tray of the user 50 so that it can be deployed as an applet. The MDS 62 throttles delivery of applets so that the amount of temporary memory tied up on the user device is kept to a minimum.

I a device is offline when an applet is delivered, the device will not receive the applet. To view information from applets that have been missed or not delivered, a user may access a user dedicated web page, on which all information provided through applets (delivered and undelivered) is identified. The dedicated web page may include all information from the current day, week, month or any other time frame. The user may select information, such, as, for example, an offer that they missed because the device was offline. If a user is traveling, the user may enter the zip code for where the user is located to provide alerts to local offers presented through applets. The zip code information may also be updated automatically upon activation of the device at the new location or upon the user signing onto the system from the new location.

In order for an applet to be activated and operational, the applet software application must be installed on the hard drive or other memory of a user's device. Once installed, the application is then able to communicate with the CPT System database and information may be transmitted among the database, the CPT System and the user's device such that the database will recognize the user's device as being registered or belonging to an active user. When installed, the application will provide information to the CPT System allowing the CPT System to identify when the user's device is online and offline.

The applet may also incorporate state of the art security so that a user can be protected from viruses and other software related problems. Encryption may be built into the system to prevent hacking and outside elements from utilizing the applets for their own purposes. Additionally, if another application is downloaded onto the hard drive or memory of the user device and accesses the system tray for deployment, the CPT System can identify and notify the user that this has occurred.

Applets may be deployed from the system tray onto the virtual desktop of a user device. The applet is non-invasive, although the user may realize that at certain times the applet will deploy from the system tray. The applet may include only the logo of a company or product, or it may include other or additional information. A user may go about maneuvering or working on the virtual desktop without the applet interrupting what they are doing, and their activities will not interrupt the deployment of the applet. The frequency of applet deployment may be determined by the CPT System and/or by the user through an update profile area. Applets may be deployed to new users any number of times per hour, including, for example, twelve times an hour. The action of deploying applets is passive to the user. As the CPT System integrates activity of the user into the database, users that take consistent action can have their applet deployment throttled.

The system may be set such that when a user clicks on the applet, the applet will descend into the system tray and all subsequent applet deployment with cease temporarily. At the same time a micro-browser may be launched onto the desktop. If the micro-browser sits idle for a predetermined period of time, such as, for example, thirty seconds, then the micro-browser with minimize into the task bar and this will initiate resumption of the applet deployment. If the minimized micro-browser is clicked on or otherwise activated at a later time, the applet will descend into the system tray and temporarily deactivate, and the micro-browser will maximize, allowing the user to take further action.

Other applets may be served based on the frequency of the parameters as established by the CPT System and/or the user. If no action is taken with respect to a particular applet deployment then the system will recognize this lack of action and will retract the applet for later deployment.

All actionable events are channeled through the CAR Module of the CPT System. During the reporting and analysis phase the administrator can generate multiple reports and graphs that detail different aspects of a single campaign or aggregate campaigns based on various factors and/or parameters, such as, for example, vertical, category, geo-target, event, time, or any other request of the client. Reporting is flexible and may be customized based on the clients needs or desires, or any other factors. All reports can be generated online and they can be printed so that hard copies are available, and stored in memory for future reference and retrieval.

Actionable events including date and time are generated by the CPT System. For example, this information may include: applets delivered to a user; applets deployed to a user; applets clicked on by a user; applets idled by a user; micro-browser opens by a user; micro-browser click-throughs by a user; micro-browser idles by a user; premium off opens by a user; branded offer opens by a user; directions opens by a user; weather opens by a user; coupons printed by a user; number of coupons printed by a user; number of applet views; frequency of delivered applets; frequency of deployed applets; creative types viewed; vertical or category views by a user; applet uninstalled; applet characteristics updated or changed by user; applet delivery or deployment failures; length of time for the through put process from deployment to printing of coupon, etc.

The CAR Module tracks and takes into account the data that was collected at the time of install and subsequent data uptakes, including what has been generated by user or automated updates and actionable events.

The information that is tracked by the CAR Module also includes information about the applets. For example, the CAR Module may track, analyze and report information relating to: category or vertical of offer delivered; category or vertical of offer deployed; client offer delivered; client offer deployed; client offer applet opened; client offer applet click-through; client premium offer opened; client premium offer click-through; client coupon printed; client branded offer opened; client branded offer click-through; client applet no action taken; client micro-browser no action taken; client offer frequency and responsiveness; client offer calendar and responsiveness; client offer time of delivery and responsiveness; client offer time of deployment and responsiveness; client offer delivery or deployment failure, etc. The CAR Module may also track and record instances where a user clicks on an offer but then for some reason disables the applet. The CAR Module tracks users based on a variety of factors, such as, for example, in zip code, radius, SCF, or region. It also attempts to associate individual or household information of users that may appear multiple times in the database.

The various analytics provided by the system have been described above, but can be further broken out by offer, client, category, and actionable item by user.

Figure 7:
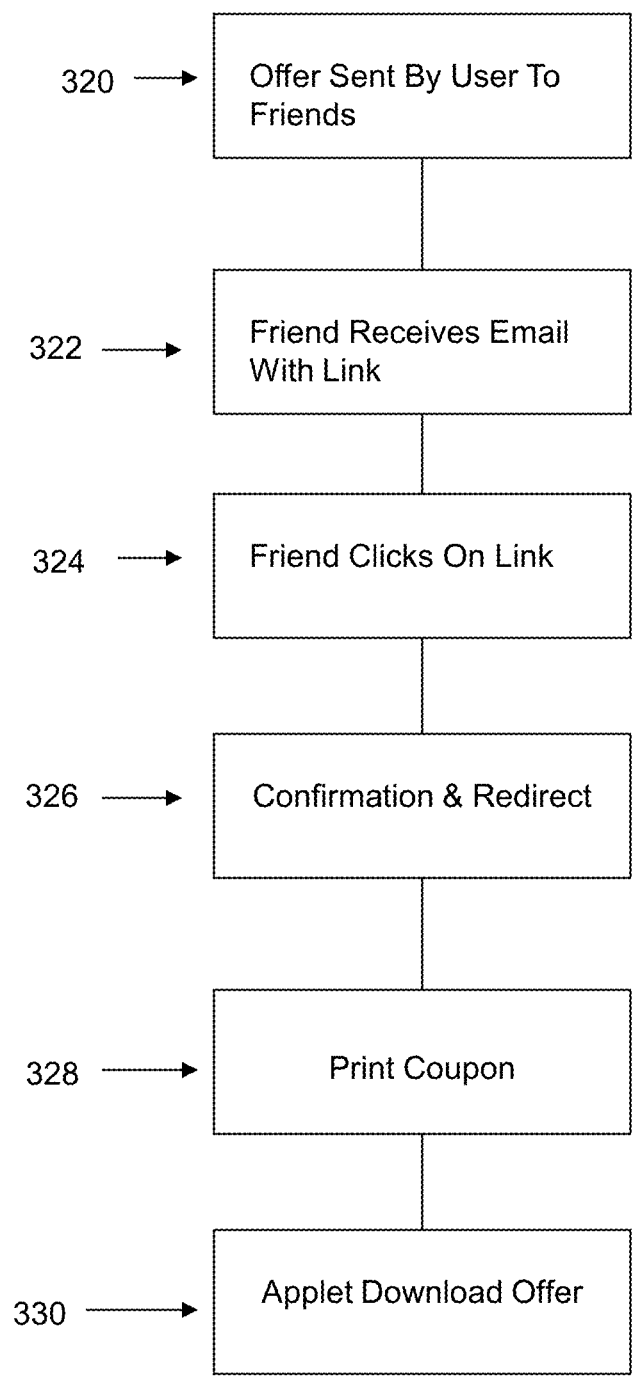
FIG. 7 shows a process for forwarding offers by a user to a friend according to an embodiment of the present disclosure.
Figure 8:
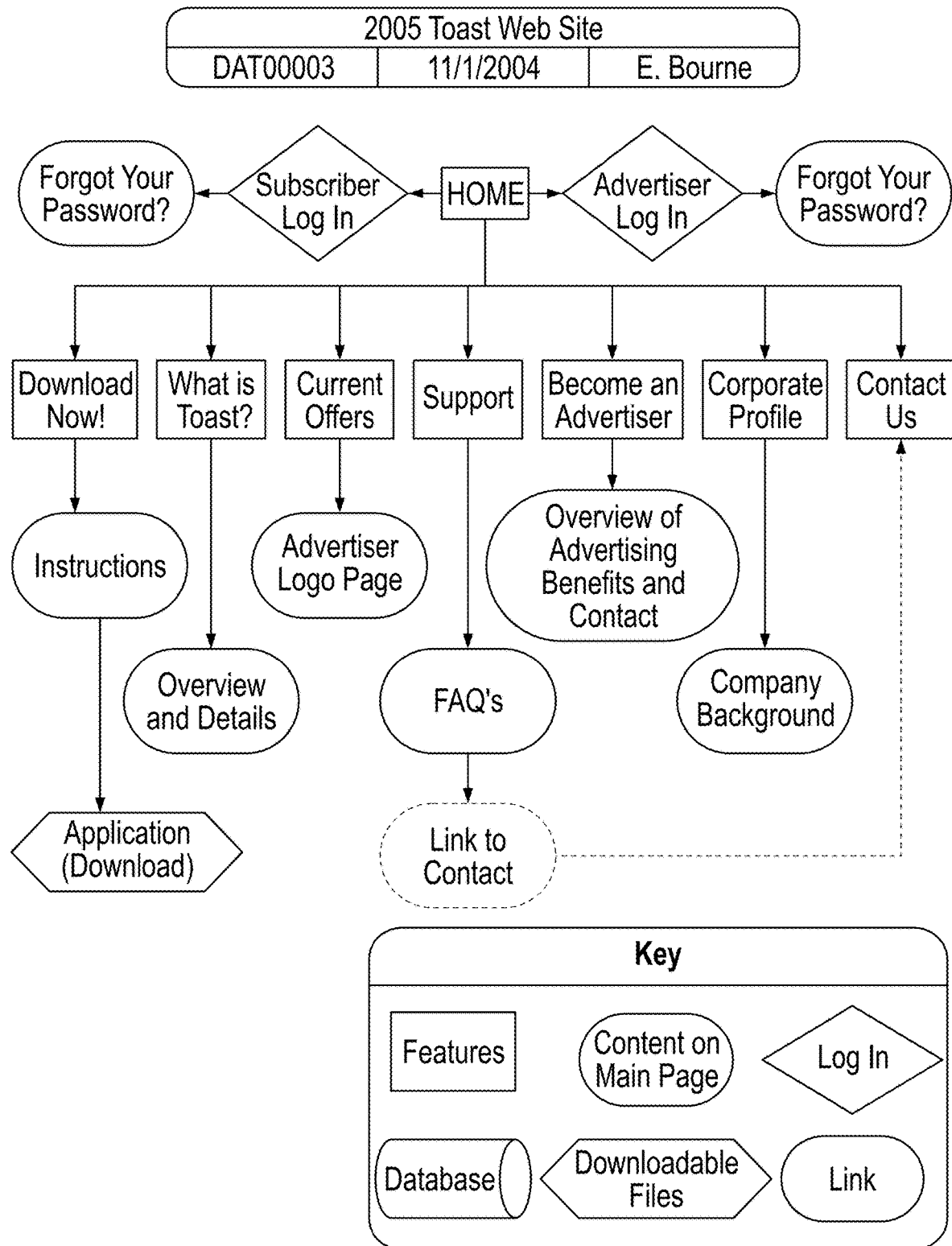
FIG. 8 shows an overview of and interconnections between pages on a web site for downloading an applet application according to an embodiment of the present disclosure.
Figure 9:
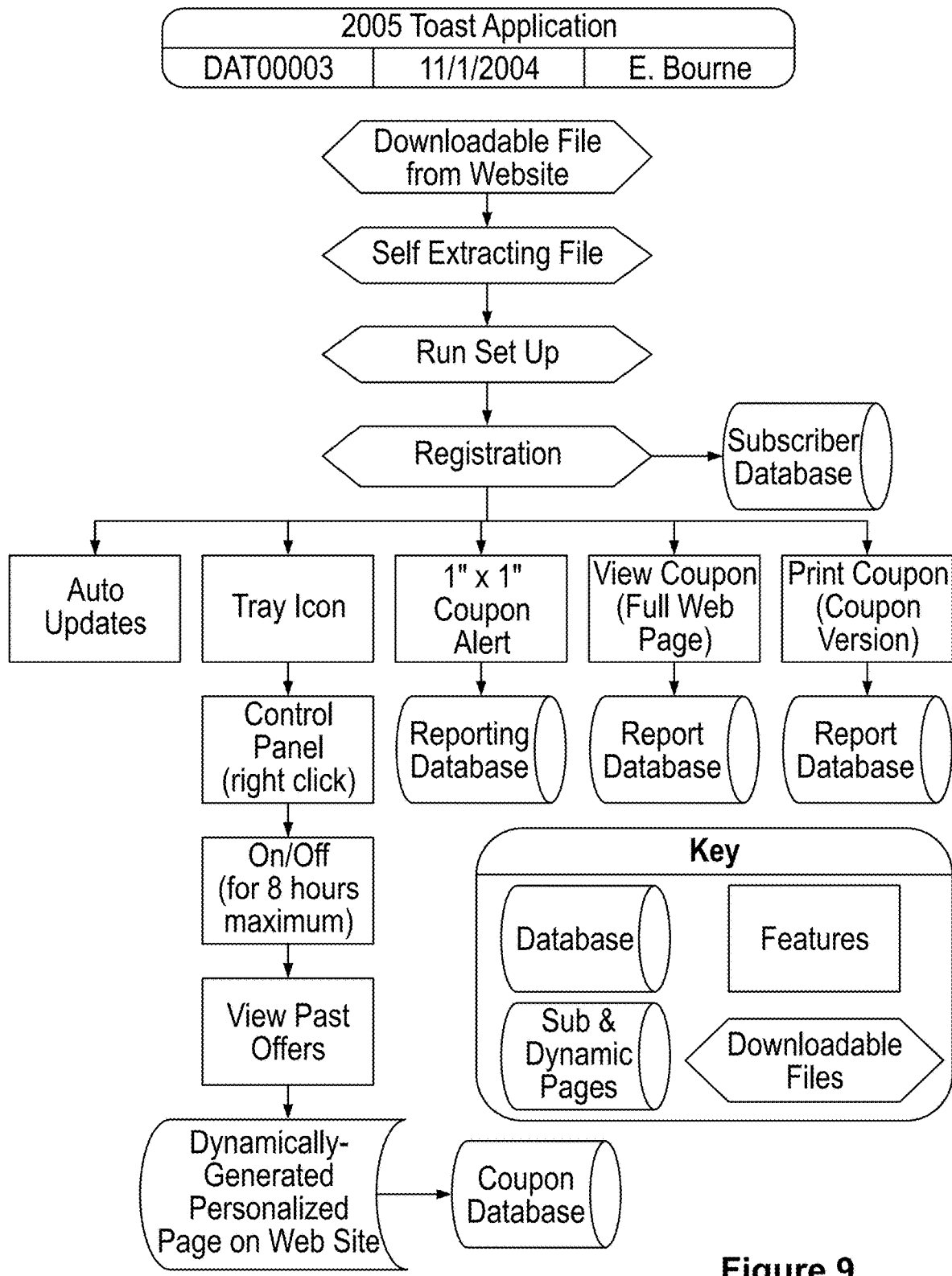
FIG. 9 shows an overview of an applet application according to an embodiment of the present disclosure.
Figure 10:
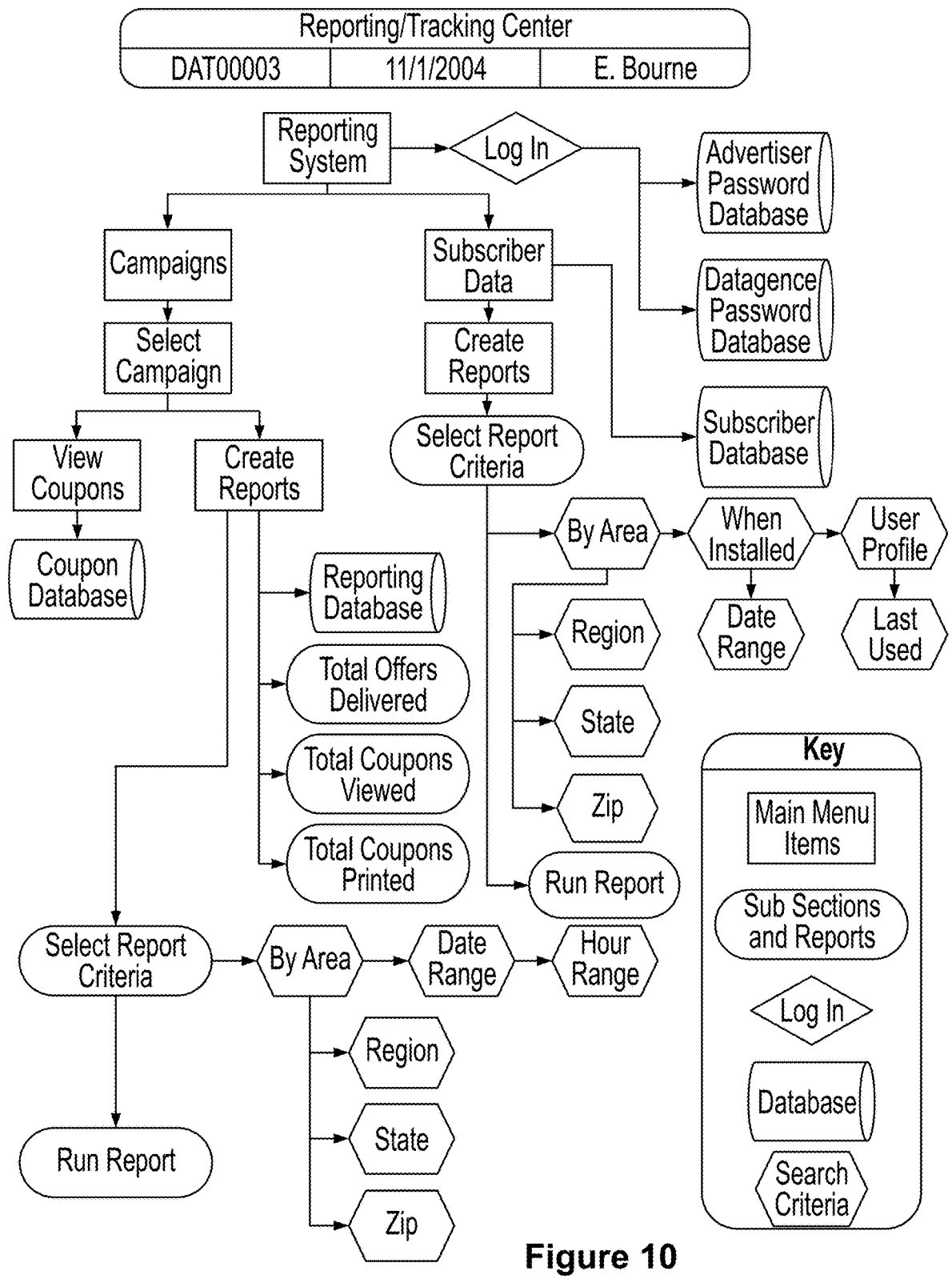
FIG. 10 shows an overview of a reporting system according to an embodiment of the present disclosure.
Figure 11:
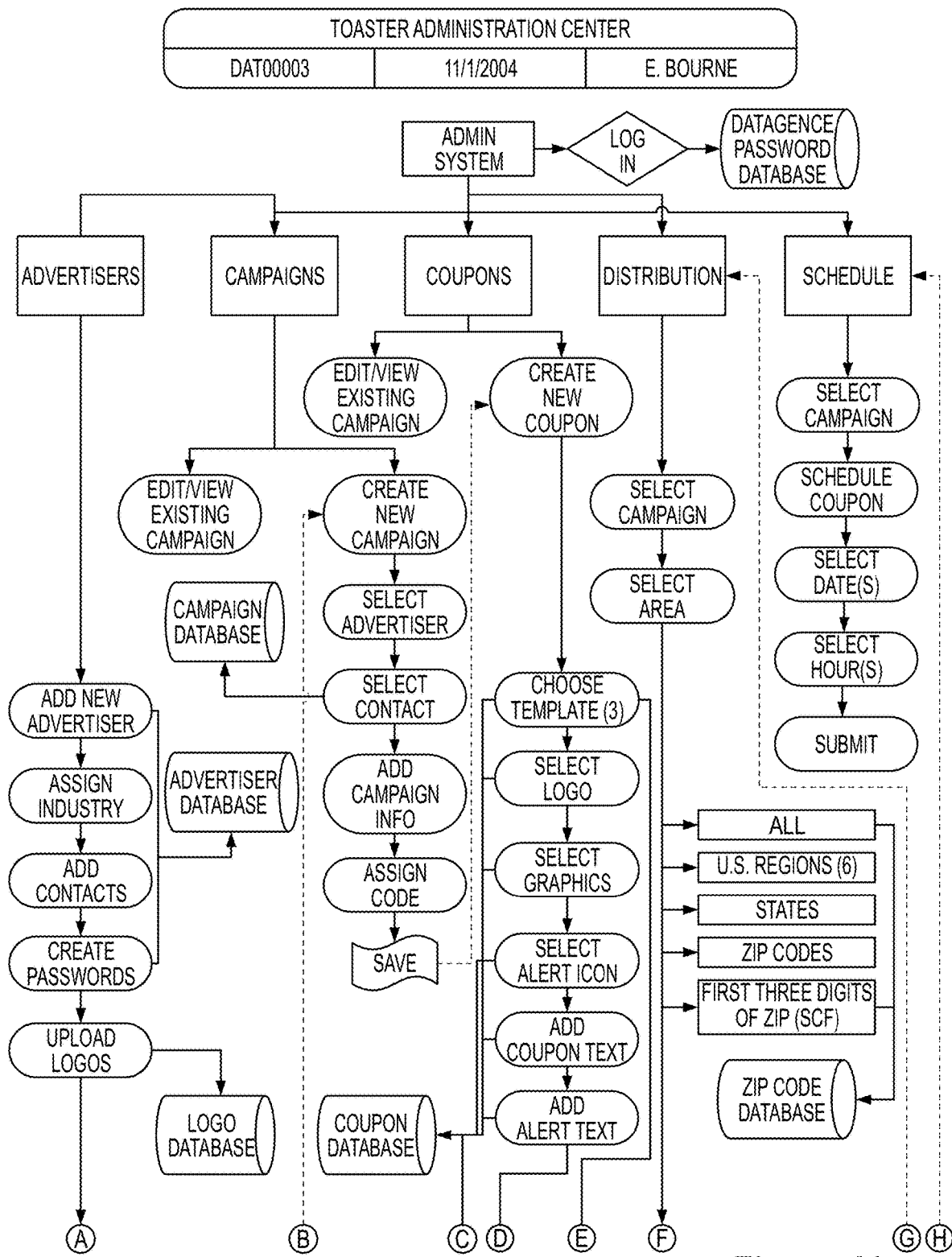
FIG. 11 shows an overview of an administration system according to an embodiment of the present disclosure.
Figure 11:
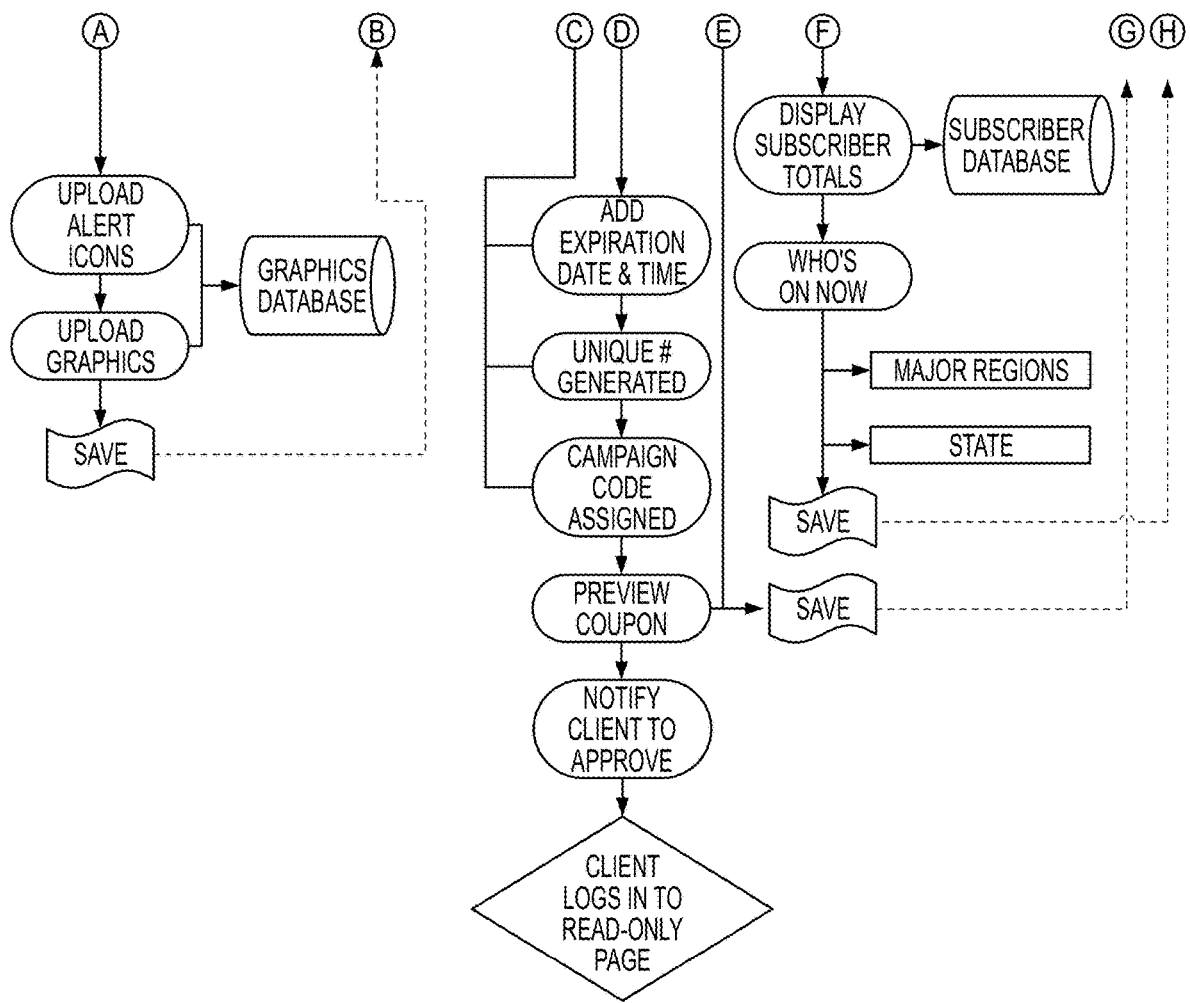
Figure 11:
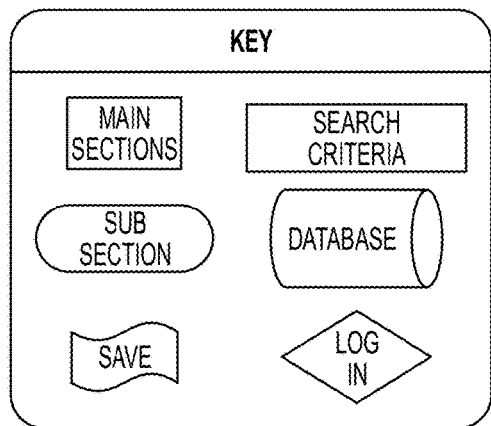

In FIG. 7 there is shown a process for forwarding offers or other information by a user to a friend according to an embodiment of the present invention. The system provides a user with the capability of sending the applet and/or the coupon offer to a friend via email. For example, the system can be designed to allow a user to send up to five applets and or coupon offers in a single correspondence.

In step 320, if a coupon offer is sent by a user via email, then in step 322, the friend will receive an email from the user that has contained within the email a link. In step 324, to obtain the coupon the friend must click on the link. The email includes information confirming that the friend received the email from the user and that it is not a SPAM communication. In step 326, after confirming that the email was not sent in error, the friend may be redirected to a web site where the coupon is located and, in step 328, the friend may print the coupon for redemption. The parameters may be set such that the friend may print a predetermined number of the coupons. In this case, only one coupon may be printed by each friend. Once the coupon is printed or the when the friend enters the web site, in step 330, the friend may be presented with an opportunity to download the applet application from the web site.

Alternatively, a user may send an offer or other information to another person using Instant Messaging, or some other communication format or medium, or by a special notice provided by email using the system, for example, by filling in an email address.

Users may be provided with incentives to promote conversions, such as, for example, some sort of incentive program. For example, if a conversion occurs as a result of a send-a-friend coupon being printed, the originating user may be credited with a conversion. Once a user accumulates credits for a number of conversions they may receive a free promotional item, or their selection from a choice of promotional items.

When an applet application is sent to the friend via email then a similar process to the process describer above may be initiated. The email is validated and a download of the application occurs. The friend is now able to receive applets. If the friend already had previously installed the application then the system will sense this information at the time of installation and let the friend know that they already have the application. The user that referred the friend may receive credit for a conversion, which can be allocated toward receipt of a promotional item.

FIGS. 8-11 depict other embodiments of the system and method according to the present 20 invention.

The invention claimed is:

1. A system comprising:
a server in communication with a client, wherein the client includes a display, an application, and a browser, wherein the server is programmed to serve a content to the application such that:
(a) the application causes the display to present the content in a predetermined viewing portion of the display that is less than an entire viewing portion of the display, wherein, at a time of the presentation of an instance of the content, the display continues to graphically operate in a state prior to the presentation of the instance of the content, and
(b) the application causes the browser to be deployed subsequent to the predetermined viewing portion presenting the content based on at least one of an action or an inaction of a user of the display with respect to the content presented in the predetermined viewing portion, wherein the presented instance of the content becomes non-interactive on the display upon deployment of the browser.

2. The system of claim 1, wherein the content includes at least one of an advertising content, an offer content, a coupon content, a news content, a notice content, or an alert, that each includes a hyperlink that causes the browser to deploy.

3. The system of claim 1, wherein the content includes information based on predetermined criteria of the user.

4. The system of claim 1, wherein the presentation of the content in the predetermined viewing portion occurs automatically.

5. The system of claim 1, wherein the presentation of the content in the predetermined viewing portion is via a window that enters a viewing area of the display from an edge of the display.

6. The system of claim 5, wherein the instance of the content in the predetermined viewing portion is via a window that enters the viewing area of the display from an edge of the display and becomes inactive on the display in response to exiting the viewing area.

7. The system of claim 5, wherein the instance of the content in the predetermined viewing portion is via a window that enters the viewing area of the display from an edge of the display and becomes inactive on the display by retreating to a background position.

8. The system of claim 1, wherein the non-interactivity is limited to a period of time during which the browser is deploying or the content is not visible on the display.

9. The system of claim 1, wherein the non-interactivity comprises at least one of idleness, sleep mode, non-visibility of the content to the user, inability of the user to interact with the content, or the content no longer being presented on the display.

10. The system of claim 1, wherein the browser is deployed subsequent to the predetermined viewing portion presenting the content based on the action of the user of the display with respect to the content presented in the predetermined viewing portion.

11. The system of claim 1, wherein the browser is deployed subsequent to the predetermined viewing portion presenting the content based on the inaction of the user of the display with respect to the content presented in the predetermined viewing portion.

12. The system of claim 1, wherein, upon a single interaction of the user with the presented instance of the content, both the browser will be activated and the presented instance of the content will at least one of minimize or descend into a system tray.

13. The system of claim 1, wherein an interaction of the user with the display is not interrupted as a result of the presentation of the instance of the content.

14. The system of claim 1, wherein the content is a first content, and further comprising:
a first database comprising a first set of information relating to a user; and
a second database comprising a second set of information, wherein a second content is served to the application based on a comparison of the second set of information to the first set of information.

15. The system of claim 1, wherein prior to the server serving content to the application, the application transmits identification information associated with the application to the server.

16. The system of claim 1, wherein the server is further programmed such that the content is served by the server as a result of comparing a first set of information relating to a user of the application to a second set of information related to the user to determine whether the content should be transmitted from the server system to the application, wherein the first set of information is stored in a first database of the server and the second set of information is stored in a second database of the server.

17. A method comprising:
storing, via a server, a content; and
sending, via the server, the content to a client, wherein the client includes a display, a browser, and an application, wherein the content is sent to the client such that the application:
receives the content from the server,
presents the content in a predetermined viewing portion of the display that is less than an entire viewing portion of the display, wherein, at a time of presentation of an instance of the content, the display continues to graphically operate in a state prior to the presentation of the instance of the content, and
deploys the browser subsequent to the predetermined viewing portion presenting the content based on at least one of an action or an inaction of a user of the display with respect to the content presented in the predetermined viewing portion, wherein the instance of the content becomes non-interactive on the display in response to deployment of the browser.

18. The method of claim 17, further comprising:
obtaining, via the server, a first set of information relating to the user;
performing, via the server, a comparison between the first set of information and a second set of information, wherein the comparison relates to parameters for sending the content to the application, wherein the comparison is such that a result is formed; and
at least one of transmitting, via the server, the content to the client for presentation on the display by the application based on the result or not transmitting, via the server, the content to the client based on the result.

19. The method of claim 18, wherein the first set of information includes demographic information relating to the user and the second set of information includes the parameters, wherein the second set of information is determined by a provider of the content.

20. The method of claim 17, wherein the content includes at least one of an advertisement content, an offer content, a coupon content, a news item content, a notice content, an alert, or information based on predetermined criteria of the user that each include a hyperlink that causes the browser to deploy.

21. The method of claim 17, wherein prior to the sending, via the server, of the content to a client, the application transmits identification information associated with the application to the server.

22. The method of claim 17, wherein prior to the sending, via the server, the server compares a first set of information relating to a user of the client to a second set of information related to the user to determine whether the content should be transmitted via the server to the client, wherein the first set of information is stored in a first database accessible to the server and the second set of information is stored in a second database accessible to the server.

23. A non-transitory storage medium storing a set of instructions that executably cause a computing device having a display and a browser to:
receive a content from a remote data source,
present the content in a predetermined viewing portion of the display that is less than an entire viewing portion of the display, wherein, at a time of presentation of an instance of the content, the display continues to graphically operate in a state prior to the presentation of the instance of the content, and
deploy the browser subsequent to the predetermined viewing portion presenting the content based on at least one of an action or an inaction of the user with respect to the content presented in the predetermined viewing portion, wherein the presented instance of the content becomes non-interactive on the computing device in response to deployment of the browser.

24. The non-transitory storage medium of claim 23, wherein the set of instructions executably cause the computing device to receive the content based on an analysis of
(a) a first set of information comprising demographic information relating to the user, and (b) a second set of information comprising parameters for sending the content to the computing device used by the user, wherein the analysis is remote from the computing device.

* * * * *